Dec. 25, 1962  A. W. FORD  3,070,741
ELECTRIC GENERATING APPARATUS
Filed Feb. 1, 1961  2 Sheets-Sheet 1

INVENTOR:
ARTHUR WILLIAM FORD

By: Stevens, Davis, Miller + Mosher
Attorneys

United States Patent Office 3,070,741
Patented Dec. 25, 1962

3,070,741
ELECTRIC GENERATING APPARATUS
Arthur William Ford, London, England, assignor to The English Electric Company Limited, London, England, a British Company
Filed Feb. 1, 1961, Ser. No. 86,462
Claims priority, application Great Britain Feb. 12, 1960
3 Claims. (Cl. 322—61)

This invention relates to electric generating systems for supplying a load with A.C. from a variable speed drive.

The system according to the invention includes, in combination, electric generating apparatus incorporating a stationary magnetic system having two polyphase windings between which there is substantially no mutual inductance and a co-operating rotor system having two polyphase rotor windings between which there is also no mutual inductance, one of the rotor windings being coupled magnetically to one of the stator windings and the other rotor winding being coupled magnetically to the other stator winding, and the two rotors being connected together electrically in a closed circuit, a differential gear box having its input shaft arranged to be driven at variable speed and having its two output shafts connected respectively to a synchronous generator and to said rotor system, the synchronous generator and one of said stator windings, hereinafter referred to as the output winding, being connected directly to the output circuit, and the other of said stator windings, hereinafter referred to as the control winding, being connected to the output circuit through a variable frequency source capable of supplying power to, or receiving power from, said output circuit, and frequency responsive means responsive to the output frequency of said electric generating apparatus arranged to vary the frequency of the variable frequency source automatically in a sense to maintain the output frequency in accordance with a predetermined law.

Figure 1:
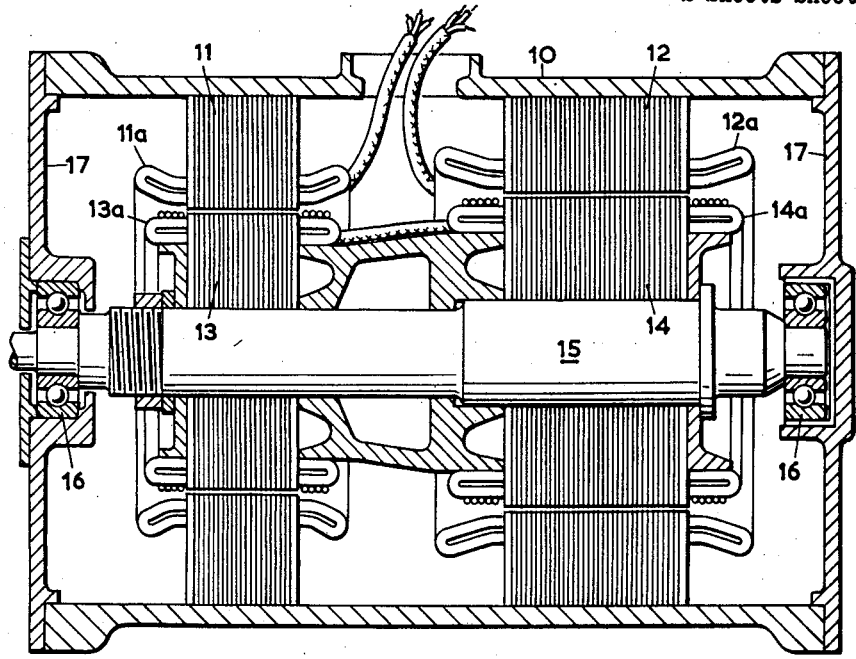
Figure 2:
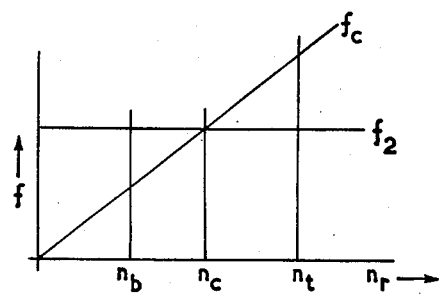
Figure 3:
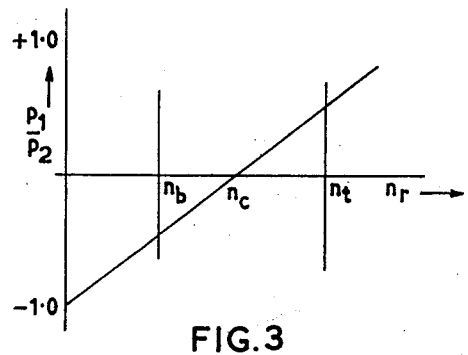
Figure 4:
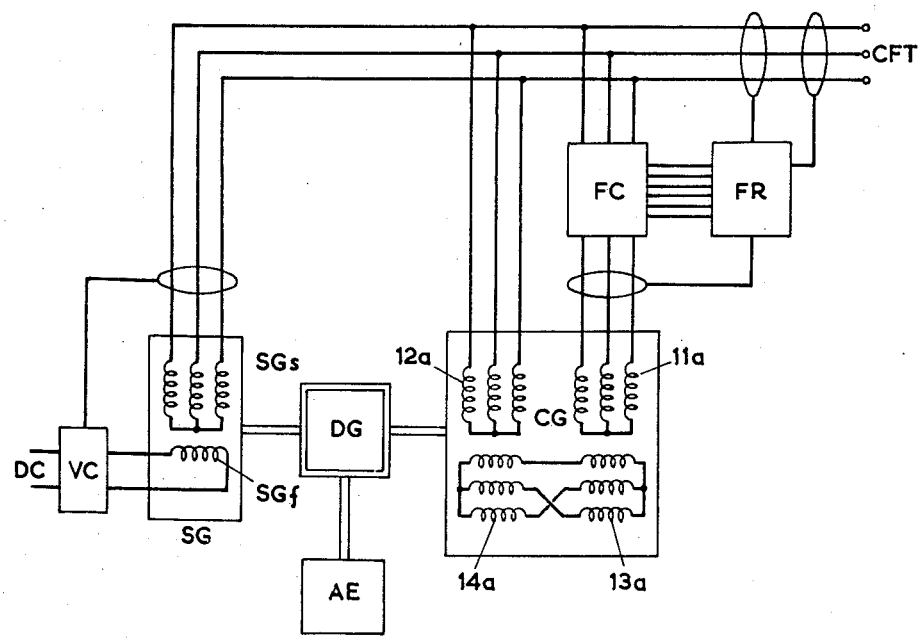

Further features of the invention will appear from the following description with reference to FIGS. 1–4 of the accompanying drawings. FIG. 1 is a sectional elevation through one form of electric generating apparatus for use in the system according to the invention incorporated in a single machine, FIGS. 2 and 3 are graphs illustrating the operation of the machine, whilst FIG. 4 is a simplified block circuit diagram of the complete generating system as applied to the generation of constant frequency power from a variable speed aircraft engine.

Referring now to FIG. 1 the machine includes a stator frame 10 in which are mounted two separate laminated stator cores 11 and 12 carrying three-phase A.C. distributed windings 11a and 12a respectively. Corresponding laminated rotor cores 13, 14 having three-phase distributed windings 13a and 14a respectively are mounted on a common shaft 15 which is journalled in bearings 16 carried by the stator end plates 17. Windings 11a and 13a are wound for $p1$ pole pairs whilst windings 12a and 14a are wound for $p2$ pole pairs. The windings 13a and 14a are connected together electrically in a closed circuit.

The two rotor windings 13a, 14a may be connected together in one of two ways, namely, either, (a) positively if the magnetic fields created by the rotor currents revolve in opposite directions with respect to the rotor shaft, and (b) negatively if the magnetic fields created by the rotor currents revolve in the same direction with respect to the rotor shaft. When three-phase alternating currents having a frequency $f_1$ cycles per second flow in stator winding 11a a magnetic field is created, which revolves at a speed of $f_1/p_1$ revolutions per second. If now the rotor is driven by an external agency at a speed of $n_r$ revolutions per second, then the frequency of the currents in the rotor winding 13a is $f_{r1} = f_1 - n_r p_1$ cycles per second.

Similarly, the frequency of the currents in the rotor winding 14a is $f_{r2} = f_2 - n_r p_2$.

The relationship between these two rotor frequencies is $$-f_{r2} = \pm f_{r1}$$

Whence $$(f_1 \pm f_2) = n_r(p_1 \pm p_2) \qquad (1)$$

It may also be shown that the per-unit slips of the rotor windings are related by the equation $$-\frac{s_1}{s_2} = \pm \frac{f_2}{f_1} \qquad (2)$$

where the $\pm$ sign indicates the alternatives appropriate to the connections between the rotor windings, in accordance with the sign convention defined above. Simple relationships between the voltage and power at the terminals of the two stator windings 11a, 12a can be deduced by the application of well-known electrical circuit theory, assuming the windings to have ideal properties, namely negligible resistance and leakage reactance, and that there are no losses due to eddy currents in any of the machine parts. On these assumptions, $$\frac{V_1}{V_2} = \frac{P_1}{P_2} = \pm \frac{f_1}{f_2} \qquad (3)$$

where $V_1$ = voltage at the terminals of stator winding 11a
$V_2$ = voltage at the terminals of stator winding 12a
$P_1$ = power delivered from stator winding 11a
$P_2$ = power delivered from stator winding 12a By combining Equations 1 and 2 we obtain, $$\frac{V_1}{V_2} = \frac{P_1}{P_2} = \pm \left[ \pm \frac{(f_c - f_2)}{f_2} \right] \frac{f_c - f_2}{f_2} = \frac{f_c}{f_2} - 1 \qquad (4)$$

where $f_c = n_r(p_2 \pm p_1)$ and will be referred to in this specification as the cascade frequency.

The fundamental properties of the ideal machine when used as a frequency converter are defined by Equations 2 and 3. These equations are illustrated graphically in FIGS. 2 and 3 for the case of a machine with positively-connected rotor windings arranged to deliver a constant frequency output when driven at any speed between a lower limit $n_b$ and an upper limit $n_t$. The cascade frequency $f_c$, being directly proportional to the rotor shaft speed $n_r$, is represented by a straight line in FIG. 2. At a certain shaft speed, $n_c$, which may be defined as the cross-over speed, the cascade frequency will be equal to the desired constant output frequency $f_2$. In FIG. 2 the cross-over speed lies somewhere between the limits $n_b$ and $n_t$, although it will be evident that it could lie outside these limits, or coincide with one or other of them. FIG. 3 shows the variation of $P_1/P_2$ with shaft speed $n_r$, as defined by Equation 3. At speeds below the cascade frequency, $f_1/f_2$ and $P_1/P_2$ are both negative and the output frequency has therefore to be made up to the required value $f_2$ by injecting power into stator winding 11a at the make-up frequency $f_1$. At speeds above the cascade frequency, $f_1/f_2$ and $P_1/P_2$ are both positive and power has to be extracted from the stator winding 11a to maintain the output frequency at the required value $f_2$.

When the machine is used as described above, one of the stator windings, designated as stator winding 12a for convenience, will deliver power at a substantially constant frequency $f_2$ irrespective of the cascade frequency $f_c$ (which is directly proportional to the shaft speed), provided that the frequency and power at the terminals of stator winding 11a are adjusted to satisfy Equations 3 and 4 above.

Likewise the output voltage $V_2$ of the stator winding 12a may be maintained at a substantially constant value by appropriate adjustment of the input voltage $V_1$ of the stator winding 11a.

Referring now to FIG. 4, the differential gear box DG is driven from the aircraft engine AE and one of its output shafts is coupled to a synchronous generator SG whilst the other output shaft is coupled to the machine CG.

The stator winding SGs of the synchronous generator SG, the stator winding 12a of the machine CG, and the constant frequency terminals of the static frequency changer FC are connected directly to constant frequency output terminals CFT. The other stator winding 11a of the machine CG is connected to the variable frequency terminals of the frequency changer FC.

In operation, the output frequency of the stator winding 12a of the machine CG is maintained substantially constant at approximately 400 cycles by the frequency changer FC which controls the frequency of the power flowing between the stator winding 11a and the constant frequency output terminals CFT. The frequency and magnitude of the voltages applied to the stator winding 11a are controlled by signals fed into the frequency changer FC from the regulator FR.

The regulator FR senses the frequency at the output terminals CFT, compares it with a suitable reference and adjusts the make-up frequency via the frequency changer FC in a sense to maintain the frequency at the output terminals CFT equal or proportional to that of the frequency reference. The regulator also senses the reactive power flowing out of the frequency changer FC in either direction and adjusts the voltage generated by the frequency changer in a sense to ensure that the frequency changer delivers power at unity or leading power factor.

From the foregoing it will be apparent that the synchronous generator SG is tied electrically to the output terminals CFT and will therefore run at a substantially constant speed. It follows that the machine CG will rotate at a speed proportional to the difference between the speeds of the aircraft engine AE and the synchronous generator SG.

The field winding SGf of the synchronous generator SG is supplied from a direct current source DC via a voltage control unit VC responsive to the voltage at the output terminals CFT and arranged to vary the excitation of the generator automatically in a sense to maintain this voltage substantially constant.

It will be understood that the electric generating apparatus as hereinbefore defined, may comprise separate machines coupled together mechanically. Where the separate stages are incorporated in a single housing with the rotors mounted on a common shaft, either the stator windings or the rotor windings, or both, may be carried by a common stator and rotor core respectively, provided that the windings are wound for different numbers of poles so as to avoid interaction between the windings.

What I claim as my invention and desire to secure by Letters Patent is:

1. A generating system for supplying a load with A.C. from a variable speed drive, including, in combination, electric generating apparatus incorporating a stationary magnetic system having two polyphase windings between which there is substantially no mutual inductance and a co-operating rotor system having two polyphase rotor windings between which there is also no mutual inductance, one of the rotor winding being coupled magnetically to one of the stator windings and the other rotor winding being coupled magnetically to the other stator winding, and the two rotors being connected together electrically in a closed circuit, a differential gear box having its input shaft arranged to be driven at variable speed and having its two output shafts connected respectively to a synchronous generator and to said rotor system, the synchronous generator and one of said stator windings, hereinafter referred to as the output winding, being connected directly to the output circuit, and the other of said stator windings, hereinafter referred to as the control winding, being connected to the output circuit through a variable frequency source capable of supplying power to, or receiving power from, said output circuit, and frequency responsive means responsive to the output frequency of said electric generating apparatus arranged to vary the frequency of the variable frequency source automatically in a sense to maintain the output frequency in accordance with a predetermined law.

2. A generating system according to claim 1, including reactive power responsive means responsive to the reactive power flowing out of the variable frequency source arranged automatically to vary the output voltage of the variable frequency source in a sense tending to cause the variable frequency source to deliver power at unity or leading power factor.

3. A generating system according to claim 1, including voltage responsive means responsive to the output voltage of the generating apparatus arranged automatically to vary the excitation of the synchronous generator in a sense to maintain said output voltage substantially constant.

No references cited.